United States Patent [19]

Woodworth et al.

[11] 3,924,458

[45] Dec. 9, 1975

[54] PRESSURE SENSITIVE CONTROL DEVICE

[75] Inventors: William H. Woodworth; Robert D. Cunningham, both of China Lake, Calif.

[73] Assignee: The United States of America as represented by the Secretary of the Navy, Washington, D.C.

[22] Filed: Apr. 1, 1974

[21] Appl. No.: 457,159

[52] U.S. Cl............ 73/133 R; 73/88.5 R; 244/83 E
[51] Int. Cl.².......................................... G01L 5/22
[58] Field of Search...... 73/88.5 R, 88.5 SD, 133 R, 73/88.5 R; 324/130; 244/83 E

[56] References Cited
UNITED STATES PATENTS

| | | | |
|---|---|---|---|
| 2,535,667 | 12/1950 | Burger et al. | 73/88.5 R X |
| 3,447,766 | 6/1969 | Palfreyman | 73/141 A X |
| 3,714,806 | 2/1973 | Berkey et al. | 73/88.5 R X |
| 3,791,204 | 2/1974 | List et al. | 73/88.5 R |

*Primary Examiner*—Charles A. Ruehl
*Attorney, Agent, or Firm*—R. S. Sciascia; Roy Miller

[57] ABSTRACT

A substantially unmovable joy stick having strain gauges such that pressure on the stick causes stress which alters the resistance of the gauges. The gauges' resistance is included in a circuit which provides an output in response to the pressure and automatically adjusts for initial conditions.

1 Claim, 3 Drawing Figures

PRESSURE SENSITIVE CONTROL DEVICE

BACKGROUND OF THE INVENTION

In the field of automatically controlled devices, a "joy stick" is often included within the controls manned by the operator. The forces applied by the operator to the joy stick are translated into electrical signals and conveyed to the remote device. The electrical signals generated are directly related to the force applied by the operator. Thereby, the remote device can be precisely controlled by the operator.

The most common configuration for the control device is a moveable joy stick coupled by springs to sense the movement and position of the stick. The force applied to each spring is sensed at its mounting and converted into an electrical signal which is coupled to the remote device. A more recent development has been the utilization of strain gauges mounted on a substantially fixed joy stick. The gauges sense the pressure applied to the stick and convert it into an electrical signal which is, likewise, coupled to the remote device.

The prior devices, whether they include springs or strain gauges, are sensitive to temperature variations and other natural instabilities. As the result, the outputs they provide may include initial conditions that are not directly related to the force applied by the operator. When that occurs, undesirable offsets result in the remotely controlled device. The present invention overcomes this deficiency by automatically compensating for the initial conditions that may be present when temperature sensitive sensors such as strain gauges are utilized.

DESCRIPTION OF A PREFERRED EMBODIMENT

Figure 1:
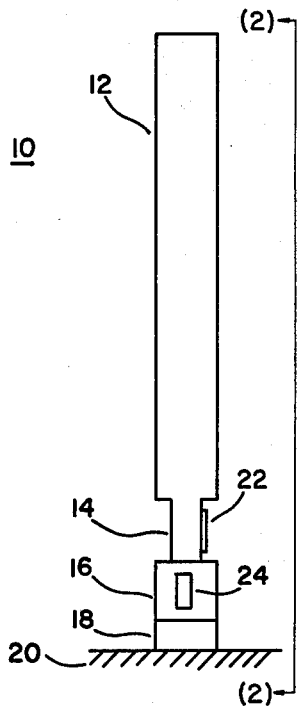
FIG. 1 shows an elevational plan view of an exemplary embodiment of the joy stick of the present invention.
Figure 2:
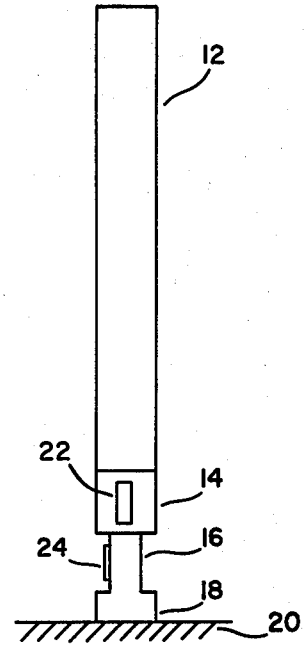
FIG. 2 shows an elevational plan view of an exemplary embodiment of the joy stick of the present invention.

FIG. 1 shows an elevational plan view of an embodiment of the joy stick of the present invention. Joy stick 10 includes shaft 12 having reduced areas 14 and 16, and base 18 mounted on support 20. FIGS. 1 and 2 show first and second sides of stick 10 to demonstrate desirable placement of strain gauges 22 and 24. Additional strain gauges may be employed on opposite surfaces of the cut-out portion if desired. By arranging the gauges as shown any lateral force applied to shaft 12 by the operator will deform one or more of the gauges 22, 24 etc.. An arrangement similar to that shown in U.S. Pat. No. 3,561,280 to John Mac Phee and Edgar R. Lodi, entitled "Three Axis Strain Gage Control Device", may be employed if rotational as well as, or instead of, translational forces are to be measured.

As is well known in the art, the resistivity of a common strain gauge changes when it is exposed to deformation forces. As a result, the change in resistivity can be employed to provide an electrical signal output indicative of the forces applied to the gauge. If the gauge is fixedly attached to a shaft, as is done with gauges 22 and 24 to shaft 12 of the present invention, deformation forces applied to the shaft can be measured.

Figure 3:
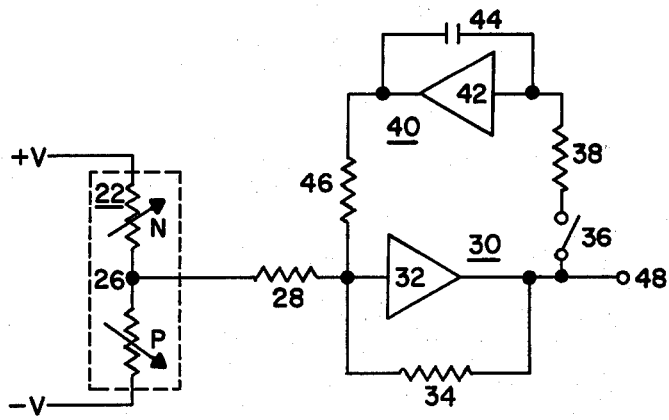
FIG. 3 shows the preferred embodiment of the electrical circuitry coupled to each of the strain gauges, including the preferred embodiment of the arrangement to compensate for initial conditions.

FIG. 3 shows the preferred embodiment of the circuitry associated with each gauge employed in the present invention. Strain gauge 22 is taken as an example and shown to include variable resistive materials N and P having junction 26. Gauge 22 is coupled across a voltage supply providing voltages +V and −V to the resistive material. As the gauge is placed in tension one of the materials, such as N, will increase in resistance concurrently with a decrease in the resistance of the other material, such as P. If the gauge is placed in compression the role of the materials are reversed, and the first material, such as N, decreases in resistance while the resistance of the other material, such as P increases. As a result, the voltage at junction 26 will be directly related to the deformation force applied to gauge 22 and, thereby, shaft 12, or, in other words, to joy stick 10.

The voltage at junction 26 is coupled through input resistor 28 to amplifier 30 which provides an output at terminal 48. Amplifier 30 includes an operational amplifier 32 having feedback resistor 34. Integration circuit 40 is also included to compensate for the initial conditions present in the system. It includes coupling resistors 38 and 46, and operational amplifier 42 having feedback capacitor 44, all of which are coupled across amplifier 30 by selectively controlled switch 36.

It at time equals zero ($t=0$) switch 36 is closed, coupling integrator 40 to amplifier 30 as a feedback network, the output at terminal 48 will be driven to zero and the output will be maintained at zero until the integrator is taken out of the system by opening switch 36. The above described operation occurs because capacitor 44 of integrator 40 charges to a value that is equal to the input's substantially constant value. The capacitor's value is opposite in polarity to the input which causes their combined inputs at amplifier 30 to be zero.

Switch 36 is opened when the operator desires to initiate the operation of the system. Switch 36 may be conveniently located on the top or side of the stick for easy access by the operator. When switch 36 is opened the feedback voltage appearing on integrator 40 which caused the output at terminal 48 to be zero, is locked into the system as a constant. Thereby, the system automatically zeros itself by compensating for the initial conditions that may be present.

To reiterate, the operation of the preferred embodiment of the present invention is as follows: switch 36 is maintained in a closed position until the operator desires to initiate his control over the remotely controlled device coupled to the output at terminal 48. What may be termed initial conditions resulting from small or even relatively large deformation forces, such as caused by heat, are compensated for by integrator 40 in a feedback network across amplifier 30. Integrator 40 operates to develop an equal, but opposite, feedback value to the initial condition value coupled to amplifier 30. As a result, the output at terminal 48 is taken to zero, and will be maintained there as long as switch 38 is closed.

When the operator desires to initiate control over the remotely controlled device coupled to the output at terminal 48, he opens switch 36. The feedback value is, thereby, locked into the integrator and coupled to the input of amplifier 30 to maintain the initial condition compensation. Thereafter, the control forces applied by the operator are in addition to the initial conditions which include the compensation, and an output indicative of the deformation force applied is faithfully provided at output terminal 48. As a result, the remotely controlled device responds only to those forces applied by the operator. It should be noted that the circuitry of FIG. 3 would be duplicated for each strain gauge or gauge pair employed. It is intended that one such circuit be employed in the measurement of the forces applied to each axis, including the rotational axis if included within the system. An advantage of the present invention over the prior devices is its ability to compensate for the initial conditions that may be present in the system, and, thereby, eliminating the shudder, jerk or bias that may otherwise occur in the remotely controlled device.

What is claimed is:

1. A pressure sensitive control device for placing a remotely located apparatus to which it is electrically connected under the positive control of a human operator by providing electrical outputs coupled to said apparatus that are responsive to the hand pressure applied to the device by the human operator, consisting of:

a substantially rigid, hand-holdable member subjected to said pressure applied by the operator;

orthogonally positioned strain gauges mounted on said member for sensing said pressure applied to said member, wherein the electrical conductivity of at least one of said gauges is altered when said pressure is applied;

an individual electrical circuit coupled to each of said gauges for measuring said alteration and automatically compensating for initial conditions;

each gauge having first, second and third external electrical terminals, said first and second terminals connected to equal but opposite voltage sources, and said third terminal disposed electrically between said first and second terminals, and connected to its said circuit;

each circuit comprising a first operational amplifier coupled to said third terminal and having a first feedback branch including a resistor coupling the output of said amplifier to its input, and a second feedback branch including a second operational amplifier with capacitive feedback as an integrator and an operator controlled switch for selectively coupling said integrator across said first operational amplifier;

such that said switch is closed coupling said integrator across said first operational amplifier to maintain the output of said device at zero by developing a compensating electrical value in the integrator equal but opposite to the output value of said first amplifier, which integrator value is coupled to the input of said first amplifier to drive the output of said first amplifier to zero; until active operation of the device is initiated by said operator by opening said switch, which opening locks the then value in said integrator to the input of said first amplifier to maintain compensation of the initial conditions causing the output of said first amplifier to be responsive to only said alteration of electrical conductivity of the guage to which the circuit is connected, whereby the output of said device is indicative of only the hand pressure applied to said rigid member by said operator and is precisely indicative thereof for remotely controlling an apparatus with precision.

* * * * *